United States Patent
Kaindl

(10) Patent No.: US 6,947,709 B2
(45) Date of Patent: Sep. 20, 2005

(54) METHOD FOR CALIBRATING A TESTING APPARATUS

(75) Inventor: Rolf Kaindl, Freising (DE)

(73) Assignee: Willtek Communications GmbH, Ismaning (DE)

(*) Notice: Subject to any disclaimer, the term of this patent is extended or adjusted under 35 U.S.C. 154(b) by 818 days.

(21) Appl. No.: 09/758,348

(22) Filed: Jan. 12, 2001

(65) Prior Publication Data

US 2001/0008832 A1 Jul. 19, 2001

(30) Foreign Application Priority Data

Jan. 14, 2000 (DE) .......................................... 100 01 384

(51) Int. Cl.$^7$ .............................................. H04B 17/00
(52) U.S. Cl. .................. 455/67.7; 455/424; 455/226.2; 455/226.4
(58) Field of Search .................. 455/66.1, 67.11–67.16, 455/67.7, 68, 556.1, 344–346, 347, 414, 423–425, 63.1, 226.1–226.4

(56) References Cited

U.S. PATENT DOCUMENTS

| | | | | |
|---|---|---|---|---|
| 4,118,668 A | * | 10/1978 | Strayer, Jr. | 455/67.16 |
| 4,766,600 A | * | 8/1988 | Martin | 375/224 |
| 5,057,848 A | * | 10/1991 | Rankin et al. | 343/703 |
| 5,398,276 A | * | 3/1995 | Lemke et al. | 379/21 |
| 5,710,978 A | * | 1/1998 | Swift | 455/67.11 |
| 5,761,240 A | * | 6/1998 | Croucher, Jr. et al. | 375/224 |
| 5,978,659 A | * | 11/1999 | Kim | 455/67.11 |
| 6,188,876 B1 | * | 2/2001 | Kim | 455/67.11 |
| 6,243,576 B1 | * | 6/2001 | Seike et al. | 455/423 |
| 6,313,874 B1 | * | 11/2001 | Bowyer et al. | 348/180 |
| 6,321,071 B1 | * | 11/2001 | Pekkarinen | 455/115.2 |

OTHER PUBLICATIONS

Eberspacher, Jorg; Vogel, Hans–Jorg: Global System for Mobile Communications Stuttgart: Teubner, 1997 p. 87–91. ISBN 3–519–06192–9.

Schoblick, Robert: Mestechnik fur GSM–Funktelefone. In: Funkschau, 1997, issue 16, p. 64–66.

* cited by examiner

Primary Examiner—Charles Craver
(74) Attorney, Agent, or Firm—Edell, Shapiro & Finnan, LLC

(57) ABSTRACT

A method for frequency calibration of attesting apparatus for testing or mobile terminals, such as mobile or cellular telephones, provided for operation in a mobile communication net includes testing apparatus that listens to an established communication based on a data communication between the mobile terminal and the mobile telecommunication net. Information signals underlying the communication are at least partially sampled and evaluated by the testing device. Based on this evaluation, a reference frequency unit incorporated in the testing device is calibrated. Preferably, bursts of the mobile terminal establishing the data communication are analyzed by testing apparatus as the information signals.

14 Claims, 1 Drawing Sheet

METHOD FOR CALIBRATING A TESTING APPARATUS

BACKGROUND OF THE INVENTION

The present invention relates to a method for frequency calibration of a testing apparatus or testing device for testing mobile terminals provided for operation in a mobile communication net, such as mobile or cellular telephones.

DESCRIPTION OF THE PRIOR ART

Such a method and such a testing apparatus is already known from the article "Meβtechnik für GSM-Mobiltelefone" by R. Schoblick in the German technical journal "Funkschau", 1997, No. 16, pages 64 to 66. Such testing devices which are used for testing the basic functions and basic specifications of a mobile or cellular telephone when manufacturing mobile telephones, during end control of the manufacturing process or when looking for defects in defective mobile telephones have to comprise a highly accurate internal reference frequency in order to sample or measure the necessary high frequency (HF) or radio frequency (RF) parameters of the data transmission operation. However, the corresponding reference frequency oscillators incorporated in the testing device might deviate or drift away, respectively, of the desired frequency due to aging effects, temperature influences and so on. Therefore, a recalibration of this desired frequency is necessary from time to time. In practice, a recalibration is necessary about every year. To this purpose, highly accurate external reference frequency devices are needed which are costly due to the necessary precision. In particular, small dealer shops or service stations do not have the financial means necessary for obtaining such reference frequency devices. But, also if such a reference frequency device is readily available the correspondence of the actual frequency to the desired frequency necessary for the testing device has to be continuously checked using the external frequency standard in order to make sure that the testing device is within the necessary tolerances for measuring the radio frequency parameters. However, this also quite time consuming. On the other hand, when using a testing device, which has drifted away from the desired frequency, in case it has been unnoticed, this can cause during end control or when testing a mobile telephone that the mobile telephone under test is adjusted in a bad manner, which can for instance lead to a degradation of the reception or transmission quality, respectively.

OBJECTS OF THE INVENTION

Therefore, it is an object of the present invention to improve a method as mentioned-above so that, at any time, the desired frequency of the testing device can be tested as well as calibrated in a fast and highly accurate manner.

It is another object of the present invention to calibrate the testing apparatus "for free" by using the frequency accuracy specific and inherent to the mobile communication net.

Another object of the present invention is to calibrate a testing device without using any expensive reference frequency device and no counters. Also, the present testing apparatus does not need to be shipped to the manufacture for the purpose of calibration.

A still further object of the present invention is to provide a testing method which is applicable at any location where communication with the (wireless) telecommunication net is possible. This means almost everywhere where testing apparatus for mobile telephones are used. Therein, the new can be any suitable communication net, and in particular, a GSM (global system for mobile communication) or PCN/PCS (personal communication net/personal communication system) net.

SUMMARY OF THE INVENTION

The object according to the invention is solved in that the testing device passively listens to or taps on the established communication due to the data connection between the mobile terminal and the mobile communication net, that the information signals underlying the communication are at least partially sampled and evaluated by the testing device, and that based on this evaluation a reference frequency unit incorporated in the testing device is calibrated.

Therefore, the testing apparatus of the present invention, in contrast with prior art which typically uses a testing device to communicate with a mobile telephone to be tested, i.e., to exchange data, in a tapping or listening mode, monitors or eavesdrops on a data exchange between the mobile telephone and the net, in particular, a base station, a telecommunication satellite, and the like, and obtains, based on the sequentially generated information signals, a corresponding time and frequency standard as a calibration in standard order to carry out an adjustment or a comparison with the internal reference frequency. The internal reference frequency is the central clock for all measurements. The actual calibration can be carried out manually or automatically by software, which minimizes a measured frequency error of a mobile telephone. Therein, the communication needs to be monitored only partially, because, e.g., for a frequency calibration, only the burst frequency is necessary. The use of an expensive reference frequency device is, therefore, not needed.

An advantageous embodiment of the method according to the invention is that bit streams, which are periodically returning in the time domain, are processed as information signals, wherein bursts from the mobile terminal establishing the data connection are analyzed by the testing apparatus as bit streams, whereby a precise frequency standard for the testing apparatus is realized.

According to another advantageous embodiment of the invention, which is particularly adapted for measurement purposes, the bursts are analyzed by the testing apparatus in an asynchronous test mode in the speech channel.

It is advantageous when an initial synchronization phase between the mobile terminal and the base station occurs before the data exchange between the mobile terminal and the base station is (passively) listened to since only after a preliminary build up or transient time interval of several seconds, the bursts emitted by the mobile telephone have the pre-determined frequency prescribed by the base station and the corresponding mobile telecommunication standard.

To this purpose, for establishing a data communication between the mobile terminal and the base station, the mobile terminal is initialized and booked, to start, by the process of booking in of the mobile terminal, in particular of a mobile or cellular telephone, a communication between the mobile telephone and the corresponding base station.

According to a preferred embodiment the testing apparatus is coupled to the established communication link using a power splitter for passively listening to the communication in order to tap on the electromagnetic field underlying the communication between the mobile telephone and the corresponding base station.

Alternatively, the testing apparatus can also be coupled to the established communication link using an antenna or an antenna element positioned in proximity of the mobile terminal.

The object mentioned above is also solved by the present invention by providing a testing apparatus which comprises a switchable passive tapping or listening mode in which the testing apparatus samples and analyzes the data exchange between the mobile terminal and the base station. To this purpose the tapping or listening mode of the testing apparatus comprises a calibration ability which checks and calibrates the frequency accuracy of the reference frequency unit by a comparison of the information signals underlying the monitored data exchange with the signals from the reference frequency unit comprised by the testing apparatus.

In contrast to conventional testing apparatus which comprise only an active mode of operation for carrying out function tests of mobile telephones and which, therefore, need for frequency calibration of the internal reference frequency unit a calibration using an expensive precision frequency device, the testing apparatus according to the present invention is characterized by an additional passive mode in which a frequency standard can be accessed which is defined by the information signals exchanged between the mobile terminal and a corresponding base station.

According to a preferred embodiment of the invention the checking and calibration is carried out using a graphic real time display apparatus so that no additional visual aids for adjustment, such as an oscillograph, are needed any longer. In this manner the frequency error of the sampled bursts can be continuously monitored and can be adjusted to a minimum for a calibration of the testing apparatus, e.g. in particular in a manual manner.

Further preferred embodiments of the invention are disclosed in the dependent claims.

BRIEF DESCRIPTION OF THE DRAWINGS

The invention, as well as other features, objects, advantages and applications thereof, will be described in the following taking reference to the attached drawing. Therein, all described and/or illustrated features alone or in any possible combination form the subject-matter of the present invention independent of their summary in the patent claims or the dependencies thereof. In the drawings:

DESCRIPTION OF PREFERRED EMBODIMENTS

Figure 1:
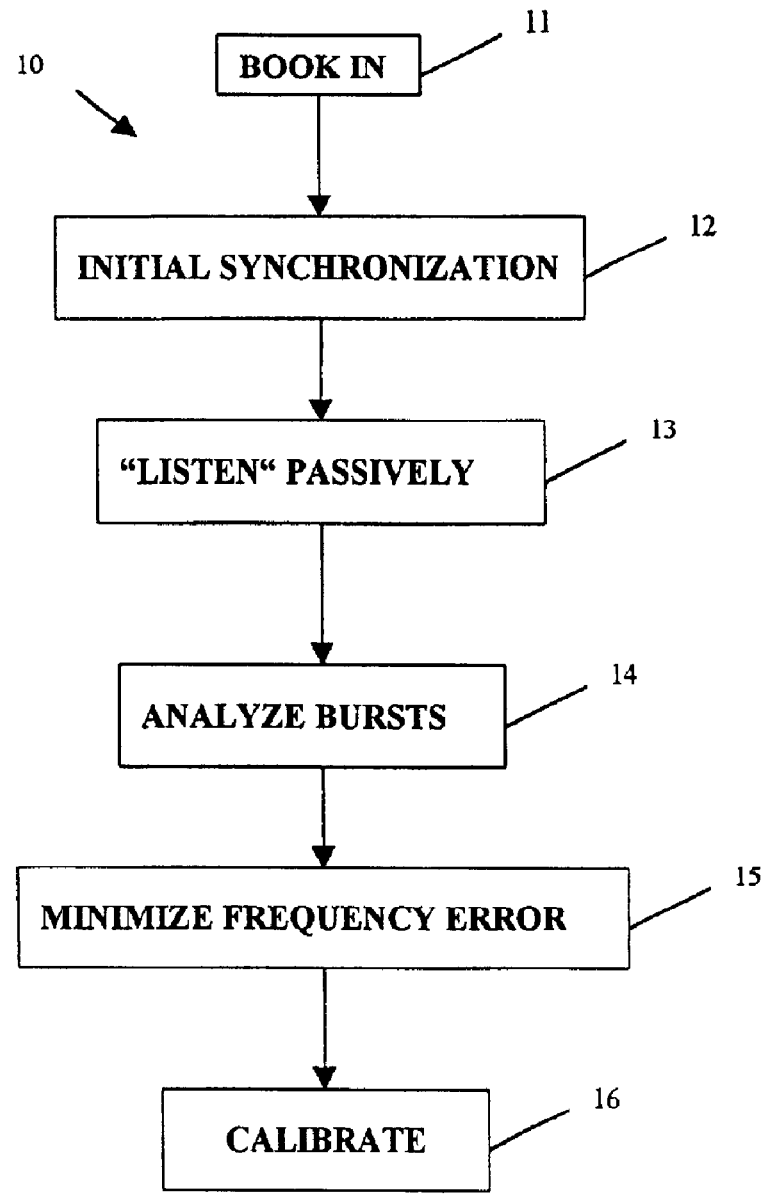
FIG. 1 shows a flowchart illustrating the essential process steps of the method according to the present invention.

The method according to the present invention is schematically shown in its essential process steps in a flowchart which is designated with the reference numeral 10 in FIG. 1. In a first process step 11 of the flowchart 10 a mobile terminal, which is in the preferred embodiment a mobile or cellular telephone, is initialized by switching the mobile or cellular telephone on and booking it or registering onto the net, whereby a connection to the respective mobile communication net is established. The connection is realized in the speech channel and can be a data connection, a SMS message, a conversation and so on. In a subsequent second process step 12 an initial synchronization phase is awaited in which the mobile telephone synchronizes after an initial build-up time period of a few seconds in a highly accurate manner onto the locally assigned base station with an accuracy of better than $\Delta v/v \approx 10^{-7}$ according to the telecommunication standard, in particular according to the ETSI standard for the GSM mobile telecommunication net (ETSI: European Telecommunication Standards Institute; GSM: Global System for Mobile Communication). Therein, the base station has a frequency accuracy which is better than $\Delta v/v \leq 10^{-9}$. In a further process step 13 the testing apparatus according to the present invention is coupled to the communication between the mobile telephone and the base station using a power splitter or an antenna which is positioned in the proximity of the mobile telephone. In this step the testing apparatus is switched to a passive listening mode. In an asynchronous test mode the bursts emitted by the mobile in the speech channel are measured and analyzed by the testing apparatus in a subsequent process step 14. The measurements of the testing apparatus show the frequency error of these bursts on a monitor or screen wherein this frequency error of the bursts is only determined by the (in)accuracy of the testing apparatus inasmuch as the accuracy of the emitted bursts is guaranteed by the ETSI standard and is normally in the range of $\Delta v/v \approx 5*10^{-8}$ or better. The frequency reference of a testing system determines the reception frequency of the tester by the principle of frequency synthesis. Only if the reception frequency of the tester is identical to the frequency of the mobile telephone the measured frequency error is zero. Therefore, each change of the frequency reference of the tester results in a different measurement value of the frequency error. If the frequency error is "zero" the frequency reference of the tester is tuned to the accuracy of the telecommunication net. In the subsequent process step 15 the reference quartz oscillator of the testing apparatus is mechanically or electrically tuned until the displayed frequency error of the bursts emitted by the mobile telephone shows a minimum. In a final process step 16 the testing apparatus is calibrated. Then, the reference quartz oscillator has an accuracy of better than $10^{-7}$ so that the accuracy taken over from the base station is by far sufficient. This exact frequency reference of the tester can subsequently also be used for another calibration of counters, analyzers and so on.

The invention has been described using a preferred embodiment thereof. However, for a skilled person it is obvious that various modifications and alterations can be made without departing from the scope and spirit underlying the present invention. In particular, it is as essential thought of the present invention to use the inherent frequency accuracy of a mobile telecommunication net in order to calibrate a testing apparatus for mobile or cellular telephones. Therefore, the "mobile telephone" can also be integrated or incorporated into the testing apparatus. Of course, when carrying out the method according to the present invention, before the actual frequency calibration, the specifications of the mobile telephones necessary for an operation in the mobile communication net can be tested, in particular by establishing a connection between the testing apparatus and the mobile telephone used for calibration purposes. It is considered to be important that the accuracy of the transmitter frequency of the mobile telephone is "read out" with a testing apparatus which was according to the prior art only used to communicate with the mobile telephone. Therefore, an "indirect" (via the mobile telephone) adjustment of the reference frequency of the tester to the exact frequency of the base station is achieved.

I claim:

1. A method for frequency calibration of a testing apparatus for testing mobile terminals provided for operation in a mobile communication net, including mobile or cellular telephones, comprising:

a testing apparatus passively listening to an established communication based on a data communication between a mobile terminal and a mobile communication net, the testing apparatus at least partially sampling and evaluating the information signals underlying the communication; and based on the evaluation, calibrating a reference frequency unit incorporated in the testing apparatus, wherein bit streams are processed as information signals and wherein calibrating the reference frequency unit includes minimizing the frequency error of the bit streams measured by the testing apparatus.

2. The method according to claim 1, wherein the established communication includes a data communication between the mobile terminal and a base station of the mobile communication network.

3. The method according to claim 2, wherein to establish a data communication between the mobile terminal and the base station, the mobile terminal is initialized and booked onto the mobile communication net.

4. The method according to claim 1, wherein, the bit streams are periodical in the time domain.

5. The method according to claim 4, wherein bursts from the mobile terminal establishing the data communication are analyzed by the testing apparatus as the bit streams.

6. The method according to claim 1, wherein the reference frequency unit is electrically calibrated.

7. The method according to claim 4, wherein the bursts are analyzed by the testing apparatus in an asynchronous test mode.

8. The method according to claim 1, wherein, prior to the testing apparatus passively listening, the mobile terminal and the base station perform an initial synchronization.

9. The method according to claim 1, wherein the testing apparatus is coupled to a power splitter.

10. The method according to claim 1, wherein the reference frequency unit is mechanically calibrated.

11. The method according to claim 1, wherein the testing apparatus is coupled to an antenna for passively listening to the communication between the mobile terminal and the communication net.

12. A testing apparatus for testing mobile terminals provided for operation in a mobile communication net, including mobile or cellular telephones, the testing apparatus comprising:

a reference frequency unit, wherein the testing apparatus passively listens to an established communication based on a data communication between a mobile terminal and a mobile communication net, the testing apparatus at least partially sampling and evaluating the information signals underlying the communication, wherein based on the evaluation, the reference frequency unit is calibrated, wherein bit streams are processed as information signals, and wherein calibrating the reference frequency unit includes minimizing the frequency error of the bits streams measured by the testing apparatus.

13. The testing apparatus according to claim 12, wherein the reference frequency unit includes a quartz oscillators.

14. The testing apparatus according to claim 12, further comprising: a graphic real time display device.

* * * * *